United States Patent [19]

Scala et al.

[11] 4,391,933

[45] Jul. 5, 1983

[54] ELECTROPHORETIC COATING OF EPOXY RESINS FROM NON-AQUEOUS SYSTEMS

[75] Inventors: Luciano C. Scala, Murrysville; Louis A. Cargnel, Unity Township, Westmoreland County, both of Pa.

[73] Assignee: Westinghouse Electric Corp., Pittsburgh, Pa.

[21] Appl. No.: 219,101

[22] Filed: Dec. 22, 1980

[51] Int. Cl.$^3$ .............................................. C08K 5/07
[52] U.S. Cl. ............................ 523/454; 204/181 C; 524/901
[58] Field of Search ................ 260/32.8 EP, 30.8 DS; 204/181 C; 523/454; 524/901

[56] References Cited

U.S. PATENT DOCUMENTS

| | | | |
|---|---|---|---|
| 3,450,655 | 6/1969 | Spiller | 260/22 |
| 3,676,383 | 7/1972 | Scala | 260/22 R |
| 4,003,812 | 1/1977 | Scala | 204/181 |
| 4,019,877 | 4/1977 | Gass | 428/626 |
| 4,115,338 | 9/1978 | Kobayashi | 260/32.8 EP |

*Primary Examiner*—Paul R. Michl
*Attorney, Agent, or Firm*—R. D. Fuerle

[57] ABSTRACT

An emulsion is prepared which comprises about 8 to about 20 percent of a solvent, about 0.5 to 5 percent of an epoxy resin dissolved in the solvent to form a discontinuous phase, about 75 to about 90 percent of a precipitant as the continuous phase, and an emulsifier in an amount sufficient to react stoichiometrically with the epoxy and hydroxyl groups on the epoxy resin up to about 900% in excess of stoichiometric. A conductive workpiece is placed in the emulsion about ½ to about 2 inches from an electrode which is also immersed in the emulsion. A direct electric current potential is applied between the workpiece and the electrode with the workpiece as the anode. About 50 to about 400 volts and about 2 to about 50 milliamperes are used until a coating of the desired thickness has been deposited on the workpiece. The solvent and precipitant are preferably ketones such as cyclohexanone, and methylethylketone or isobutylketone, respectively. The epoxy resin is preferably a bisphenol A epoxy resin having an average molecular weight of about 2000 to about 15,000. The emulsifier is preferably an amine.

13 Claims, No Drawings

ELECTROPHORETIC COATING OF EPOXY RESINS FROM NON-AQUEOUS SYSTEMS

BACKGROUND OF THE INVENTION

Description of the Invention

Electrophoretic coating of resins is predicted upon the migration of charged particles, droplets, or molecules in a conductive medium, to the electrode of the opposite sign, under the influence of an electric current. When this electrode is the workpiece, a coating of the resin is deposited upon it which can be cured to give a strong, adherent film. Since it is an electrical process which is field dependent, this procedure intrinsically seeks out and coats any flaws or pinholes not already insulated and covers points and edges preferentially and efficiently.

While most of the present commercial electrophoretic deposition processes are water based, a need and a preference have arisen for electrophoretic coatings from non-aqueous systems, mainly because an all organic medium allows the use of high performance resins, which is generally not possible in the case of aqueous electrophoretic deposition processes.

Up to now the most commonly and most successfully used high performance resins in a non-aqueous system have been aromatic polyamide-imides and polyimides. These are very expensive materials and are particularly and narrowly suited to low volume, high cost, high performance applications, such as for military purposes. It would be desirable to expand the advantages of this very efficient process to other resins of more general use; however, until now, only relatively low performance resin such as acrylates and alkyd resins, and some low molecular weight epoxies, have been reported to deposit electrophoretically at very high voltages of the order of 10 kilovolts in the presence of pigments (see U.S. Pat. No. 3,450,655). Even at these excessive voltages, the yield, as expressed by deposit thickness and weight, is very low.

SUMMARY OF THE INVENTION

We have found that excellent epoxy films of superior adhesion to metals and superior electrical properties can be obtained by the non-aqueous electrophoretic deposition of commercial epoxies at low power expenditures. This is done using relatively high molecular weight, commerical epoxy resins and low molecular weight ketones in the presence of amines by making them into stable electrophorettable emulsions when a solution of the epoxy resin is mixed with a relatively high molecular weight ketone. The electrophorettable emulsions of this invention are distinguished by their finer colloidal character, their reduced viscosity and their increased mobility. The use of relatively high vapor pressure organic liquids to make both the continuous and the discontinuous phase of the emulsion is responsible for the absence of bubbles from the cured films, for the economically desirable shortness of the cure of the electrophoretically deposited film, and for the possibility of economical recovery of the organic liquids.

PRIOR ART

U.S. Pat. No. 3,450,655 discloses the electrophoretic deposition of an epoxy resin from a solution.

U.S. Pat. No. 4,019,877 discloses the electrophoretic deposition of polyamic acids, followed by heat to form a polyamide film.

U.S. Pat. No. 4,003,812 discloses the electrophoretic deposition of a polysulfone.

U.S. Pat. No. 3,676,383 discloses the electrophoretic deposition of various resins, including epoxies, from nitroalkanes.

DESCRIPTION OF THE INVENTION

The emulsion of this invention comprises about 8 to about 20 percent (all percentages herein are by volume unless otherwise noted) of a solvent as the discontinuous phase, about 0.5 to about 5 percent of an epoxy resin dissolved in the solvent, about 75 to about 90% of a ketone precipitant as the continuous phase, and an emulsifier.

The epoxy resins which are suitable for use in this invention are any polymers which have one or more epoxy groups on the polymer chain. This includes bisphenol A epoxy resins, novolak epoxy resins, and epoxy terminated resins (i.e., epoxidized polymers) such as epoxidized acrylics, epoxidized polyesters, and epoxidized polyolefins. Epoxidized polymers may be used in order to obtain particular properties which are imparted by the particular polymer selected. The preferred epoxy resin is a bisphenol A epoxy resin having an average molecular weight of about 2000 to about 15,000. A minimum average molecular weight of at least 2000 is needed because to produce coatings that are stable on the substrate, no upper molecular weight limit on the coatability of epoxies was found.

The solvent forms the discontinuous phase of the emulsion and the epoxy resin is dissolved in the solvent. Suitable solvents include aprotic solvents such as dimethyl sulfoxide. The preferred solvent is a ketone, because ketones have the proper degree of conductivity and are easy to separate from the remnants left in the cell after coating, and they evaporate cleanly and quickly so the resin can be cured rapidly at relatively high temperatures without danger of developing blisters. The preferred solvent is cyclohexanone. The solution should be at least about 60 percent solvent because lesser amounts would destabilize the emulsion. No more that about 90 percent by volume of solution should be solvent, however, in order to maintain coating efficiency.

The precipitant is a liquid ketone which is not a solvent for the epoxy but which is miscible with the solvent. Suitable precipitants include acetone, methylethyl ketone, and methyl isobutyl ketone for the same reasons previously given for the solvent. The preferred ketones are methyl-ethyl ketone and isobutyl ketone as these ketones are easy to separate when cyclohexanone, for example, is used as a solvent. The amount of precipitant in the emulsion should be at least about 75 percent as a lesser amount prevents the formation of an emulsion. The emulsion should not contain more than about 90 percent precipitant as greater amounts of precipitant would destabilize the emulsion.

An emulsifier is needed to help form the emulsion. It is preferable to use an amine as the emulsifier because the amine performs a dual function of emulsifying and of cross-linking the epoxy resin during curing, though other emulsifiers such as aromatic anhydrides, and Friedel-Craft catalysts may also perform this dual function. Because the amine is made to react with the epoxy before electrophoretic deposition, the amine reaches the workpiece at the same rate as the epoxy, and the emulsion is not preferentially depleted of either the epoxy or the amine. Either aliphatic or aromatic amines can be used, but preferably aliphatic amines are used as they have been found to work the best. The preferred amines are primary amines, such as diethylene triamine, triethylene tetramine, triethylamine, and tetraethylene pentamine. The amount of emulsifier could be up to about 900 percent in excess of stoichiometric, based on the epoxy and hydroxyl groups on the epoxy, an amount adequate to result in an apparent emulsion pH of about 7 to about 11. No pigments or other ingredients are required to form the emulsion.

The emulsion can be prepared by dissolving the epoxy in the solvent and adding the amine, in any order. This mixture is then heated for about an hour at about 85° C. to partially react the epoxy with the amine. A color change from colorless to red indicates that the reaction is complete. The epoxy-amine solution is then poured into the precipitant and is stirred gently to form the emulsion.

The workpiece to be coated with the epoxy must be a conductive material such as a metal or graphite. Stainless steel, aluminum, nickel, and copper are preferred as they coat especially well. Coatings of a fraction of a mil up to about 10 mils can be obtained. The workpiece is made the anode and is placed in the emulsion about ½ to about 2 inches away from an electrode. If desired, an electrode may be placed on each side of the workpiece, or a hollow cylindrical electrode may be used with the workpiece in the center, if, for example, a round wire is to be coated. A voltage of about 50 to about 400 volts with an amperage of about 2 to about 50 ma is applied between the workpiece and the electrode for about 1 to about 30 minutes until the desired thickness of coating is obtained. Many different types of workpieces including magnet wires, printed circuit boards, heat sinks, electronic boxes, electrical equipment, such as cores, rotors, stators, motor frames and bolts can be successfully coated with the process of this invention. Once the desired thickness of coating is achieved, the workpiece is removed from the emulsion. The coating is then almost dry because an endo-osmotic process during deposition pushes the solvent away from the workpiece. The resin on the workpiece can then be cured with heat, for example, by heating for about an hour at about 150° to 175° C.

The following examples further illustrate this invention.

EXAMPLE 1

Five grams of a solid diglycidyl ether of bisphenol A resin having an epoxy equivalent weight of 875 to 1025, sold under the trade designation "Epon 1004" by Shell Chemical Company, was dissolved in 10 grams of methylethylketone along with 0.6 grams of triethylene tetramine. This solution was mixed with 100 milliliters of methylisobutylketone. An opaque stable emulsion was obtained after which 1 mil thick coatings were deposited on aluminum panels placed 1 inch from an electrode to which was applied 300 volts at 4 milliamps. After curing the coated aluminum panel for an hour at 175° C., a strong, adherent, thin film of epoxy resin was obtained.

EXAMPLE 2

A solution was prepared consisting of 5 grams "Epon 1004," 0.6 grams triethylene tetramine, and 25 ml. of methylethyl ketone. The solution was heated at 40° C. for a half hour to initiate reaction between the epoxy and the amine. The solution was then added to 100 milliliters of methylisobutylketone with mixing, and an opaque, stable emulsion was obtained. An aluminum panel was placed 1 inch from an electrode and the panel was coated using 400 volts at 4 milliamps. The resulting epoxy film was cured at 175° C. for 1 hour. It was a strong, adherent, thin film.

EXAMPLE 3

A solution was prepared which consisted of 5 grams of solid, diglycidyl ether bisphenol A epoxy having an epoxy equivalent weight of 2,000 to 2,500, sold by Shell Chemical Company under the trade designation "Epon 1007," 1 ml triethylene tetramine, and 25 ml methylethylketone. The solution was heated to reflux, then 25 ml. of methylethylketone was added and the solution was allowed to cool. This solution was added with mixing to 475 ml. methylisobutylketone which resulted in an opaque, stable emulsion. Uniform, strong, adherent two mil thick coatings were obtained on aluminum substrates by placing aluminum sheets in the emulsion 1 inch from an electrode to which was applied 300 volts at 4 ma for 3 minutes, followed by curing for one hour at 175° C.

EXAMPLE 4

A solution was prepared of 5 grams of a solid, diglycidyl ether bisphenol A resin having an epoxy equivalent weight of 2,500 to 4,000, sold by Shell Chemical Company under the trade designation "Epon 1009," 1 ml. tetraethylene pentamine, and 50 cc. of cyclohexanone. The solution was heated to 85° C. until it turned red. An additional 50 ml. of cyclohexanone was then added. After cooling, the solution was slowly added to 700 ml. of methylisobutylketone with stirring. This resulted in a homogeneous emulsion. One mil thick cured epoxy films having good properties were obtained by placing an aluminum sheet in the emulsion 1 inch from an electrode to which was applied 300 volts at 4 ma for 3 minutes, followed by curing at 175° C. for 1 hour.

EXAMPLE 5

A solution was prepared consisting of 5 grams "Epon 1009," 1 ml. triethylene tetramine and 50 ml. cyclohexanone. The solution was heated to 85° C. until it turned red. After 50 ml. of cyclohexanone was added and the solution was allowed to cool, a stable emulsion was formed by mixing the above solution with 700 ml. of methylisobutylketone. Aluminum sheets were coated by placing them in the emulsion 1 inch from an electrode. The voltage used was 300 volts at a current of about 10 to 16 ma. The conductivity of the solution was measured as $3.3 \times 10^{-5}$ mHos and the current density was 0.66 ma/sq. inch. The coated sheets were then air dried for ½ to 1 hour followed by curing for 1 hour at 175° C. Good electrophoretic coatings were obtained with emulsions up to 23 days old, which indicates excellent emulsion stability. The emulsion particle size was measured as one micron or less. The electrical breakdown strength values of the coatings range from 3 to 4 kV per mil of film thickness. Measurements were made using a 1¼ inch D electrode with 500 volts per second rise. Coatings of about 1 mil thick were obtained by applying 4.4 ma for 3 minutes at voltages ranging from 200 to 230 volts. Each electroplating deposited about 0.2 grams of resin (a total of ca. 1 gram) from an emulsion originally containing 5 grams of resin, coating for three minutes at a voltage of 300 volts and 20 ma on an aluminum substrate. Weight deposits of 0.82 grams, 0.58 grams, 0.40 grams, 0.28 grams, 0.18 grams, 0.10 grams, 0.07 grams, 0.07 grams and 0.02 grams were obtained for successive three minute periods for a total weight of 2.52 grams from an emulsion containing 5 grams of resin.

Tough, uniform coatings were obtained on aluminum, copper, steel, and nickel using the above procedure. In all cases the adhesion between the film and the metallic substrate, as determined by the fine cross-hatch test applied to the coated substrate by way of a new razor blade, was excellent. The widely different boiling points of the organic liquid components of the non-aqueous electrophoretic medium allowed efficient recovery of these materials by fractional distillation and they could be repeatedly used. The coatings obtained were tough, adherent, electrically strong and pinhole free, and were achieved with relatively low power expenditure.

What we claim is:

1. An emulsion for electrophoretically producing an insulating coating which comprises:
   (a) about 8 to about 20 percent of a solvent as the discontinuous phase;
   (b) about 0.5 to about 5 percent of an epoxy resin having an average molecular weight of at least 2000 dissolved in said solvent;
   (c) about 75 to about 90 percent of a ketone precipitant as the continuous phase; and
   (d) an emulsifier in an amount sufficient to react with the epoxy and hydroxyl groups in said epoxy resin up to about 900 percent in excess of stoichiometric.

2. An emulsion according to clam 1 wherein said solvent is a ketone.

3. An emulsion according to claim 2 wherein said solvent is cyclohexanone and said precipitant is methylethylketone or isobutylketone.

4. An emulsion according to claim 1 wherein said epoxy resin is bisphenol A epoxy resin having an average molecular weight of about 2000 to about 15,000.

5. An emulsion according to claim 1 wherein said emulsifier is an amine.

6. An emulsion according to claim 5 wherein said amine is a primary, aliphatic amine.

7. An emulsion according to claim 6 wherein said primary aliphatic amine is triethylene tetramine, diethylene triamine, or tetraethylene pentamine.

8. An emulsion according to claim 1 wherein said epoxy resin is an epoxidized polymer.

9. A method of electrophoretically coating a conductive workpiece with an epoxy resin comprising:
   (a) preparing an emulsion according to claim 1;
   (b) positioning said workpiece in said emulsion about ½ to about 2 inches from an electrode also immersed in said emulsion;
   (c) applying a direct correct potential between said workpiece and said electrode, with said workpiece as the anode, of about 50 to about 400 volts and about 2 to about 50 milliamperes, until a coating of the desired thickness has been deposited on said workpiece.

10. A method according to claim 9 including the additional last step of removing said workpiece from said emulsion and curing said epoxy resin.

11. A method according to claim 10 wherein said epoxy resin is cured by heating at about 150° to about 200° C. for about 30 to about 60 minutes.

12. A method according to claim 9 wherein said workpiece is wire and said electrode is a cylinder.

13. In a method of electrophoretically coating a conductive workpiece, the improvement which comprises coating from an emulsion according to claim 1.

* * * * *